(12) United States Patent
Maeda

(10) Patent No.: US 11,767,693 B2
(45) Date of Patent: Sep. 26, 2023

(54) LID OPENING AND CLOSING DEVICE FOR A VEHICLE

(71) Applicant: KABUSHIKI KAISHA HONDA LOCK, Miyazaki (JP)

(72) Inventor: Naruhiko Maeda, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 242 days.

(21) Appl. No.: 17/002,095

(22) Filed: Aug. 25, 2020

(65) Prior Publication Data
US 2021/0071448 A1    Mar. 11, 2021

(30) Foreign Application Priority Data

Sep. 5, 2019  (JP) .................................. 2019-162180

(51) Int. Cl.
*E05B 83/34*  (2014.01)
*B60K 15/05*  (2006.01)

(52) U.S. Cl.
CPC .............. *E05B 83/34* (2013.01); *B60K 15/05* (2013.01); *B60K 2015/0576* (2013.01); *E05Y 2201/434* (2013.01); *E05Y 2900/534* (2013.01)

(58) Field of Classification Search
CPC ............ B60K 15/05; B60K 2015/0561; B60K 2015/0576; B60K 2015/0584;
(Continued)

(56) References Cited
U.S. PATENT DOCUMENTS 5,664,811 A * 9/1997 Martus ................ E05B 47/0046
292/144
10,683,685 B2 * 6/2020 Sonobe .................... E05B 81/28
(Continued)

FOREIGN PATENT DOCUMENTS

JP    2016-075099 A    5/2016
JP    2016-117313 A    6/2016
(Continued)

OTHER PUBLICATIONS

Official Communication dated Jul. 13, 2022 issued over the corresponding Japanese Patent Application No. 2019-162180 with the English machine translation thereof.

*Primary Examiner* — Kristina R Fulton
*Assistant Examiner* — Noah Horowitz
(74) *Attorney, Agent, or Firm* — Carrier, Shende & Associates P.C.; Fulchand P. Shende; Joseph P. Carrier

(57) ABSTRACT

In a lid opening and closing device for vehicle, a rod can move forward and backward between pushed-in and protruding positions, and is supported on a case so that the rod can attain a lid closed position where the rod returns from pushed-in position toward protruding position only by predetermined movement amount. An axial position-restricting groove has a pin-receiving portion and is formed on the rod or a coupling member. An elastic member has a pin inserted into the groove while being receivable by the portion when the rod is at lid closed position, the elastic member being supported on the case and exhibiting resilient force making the pin resiliently abut against the rod or coupling member. The case is provided with a restricting part capable of abutting against the elastic member, and restricting displacement of the elastic member to a side where the pin is disengaged from the groove.

6 Claims, 19 Drawing Sheets

(58) Field of Classification Search
CPC ...... E05B 83/34; E05B 63/121; E05B 63/125; E05B 63/126; E05C 19/02; E05C 19/022; E05C 19/028; E05C 19/04; Y10T 292/0863; Y10T 292/0864; Y10T 292/0866; Y10T 292/0867; Y10T 292/0868; Y10T 292/0869; Y10S 292/04; Y10S 292/11
See application file for complete search history.

(56) References Cited

U.S. PATENT DOCUMENTS

| | | | |
|---|---|---|---|
| 10,691,160 B2 * | 6/2020 | Yamamoto | E05B 83/34 |
| 10,730,386 B2 * | 8/2020 | Persiani | B60K 15/05 |
| 10,767,400 B2 | 9/2020 | Sonobe | |
| 2018/0105036 A1 | 4/2018 | Guardianelli | |
| 2020/0123817 A1 * | 4/2020 | Inose | E05F 1/105 |
| 2020/0398663 A1 * | 12/2020 | Hirotani | B60K 15/05 |
| 2020/0408011 A1 * | 12/2020 | Hirotani | E05C 19/02 |
| 2021/0372172 A1 | 12/2021 | Tanaka et al. | |

FOREIGN PATENT DOCUMENTS

| | | | | |
|---|---|---|---|---|
| JP | 2019-082074 A | 5/2019 | | |
| WO | WO-2008059543 A1 * | 5/2008 | | B60K 15/05 |

* cited by examiner

LID OPENING AND CLOSING DEVICE FOR A VEHICLE

CROSS REFERENCE TO RELATED APPLICATIONS

The present application claims priority under 35 U.S.C. § 119 to Japanese Patent Application No. 2019-162180 filed Sep. 5, 2019 the entire contents of which are hereby incorporated by reference.

BACKGROUND OF THE INVENTION

Field of the Invention

The present invention relates to a lid opening and closing device for a vehicle comprising a lid that is pivotably supported on a vehicle body exterior plate, a case that is mounted on the vehicle body exterior plate, a rod that can move forward and backward between a pushed-in position in response to the lid being pushed in and a protruding position when the lid is in an open state, the rod being supported on the case so that the rod can attain a lid closed position at which the rod returns from the pushed-in position toward the protruding position side only by a predetermined amount of movement when the lid is in a closed state, an urging member that urges the rod from the pushed-in position toward the protruding position side and is provided between the case and the rod, an axial position-restricting groove that has a pin-receiving portion facing the protruding position side and is formed on the rod or on a coupling member axially relatively non-movably linked to the rod, and a rod axial direction restricting mechanism comprising the axial position-restricting groove and an elastic member that has a pin inserted into the axial position-restricting groove while being capable of being received by the pin-receiving portion in a state in which the rod is at the lid closed position and that exhibits a resilient force making the pin resiliently abut against the rod or the coupling member, the elastic member being supported on the case, the rod axial direction restricting mechanism restricting an axial position of the rod while enabling the pin to be disengaged from the pin-receiving portion in response to an operation of pushing in the lid in a closed state.

Description of the Related Art

Such a lid opening and closing device for a vehicle is known in, for example, Japanese Patent Application Laid-open No. 2016-117313.

In such a lid opening and closing device, in response to the rod being pushed in from the lid closed position to the pushed-in position by the lid in a closed state being pushed in, the rod axial position-restricting mechanism releases a state in which the pin is received by the pin-receiving part of the axial position-restricting groove, and the lid becomes openable. However, when the lid is forcibly opened without carrying out the pushing-in operation at the lid closed position, due to the pin being received by the pin-receiving part of the axial position-restricting groove, a force that makes the pin become disengaged from the axial position-restricting groove is imposed on the elastic member by the rod, and there is a possibility that the pin will be disengaged from the axial position-restricting groove. If in this way the pin is disengaged from the axial position-restricting groove, the rod cannot be retained at the lid closed position and the lid can be opened, which is not desirable in terms of theft resistance. The arrangement disclosed in Japanese Patent Application Laid-open No. 2016-117313 does not disclose a technique that can deal with such a problem.

SUMMARY OF THE INVENTION

The present invention has been accomplished in light of such circumstances, and it is an object thereof to provide a lid opening and closing device for a vehicle that enables theft resistance to be ensured by preventing a pin of an axial position-restricting mechanism from being disengaged from an axial position-restricting groove even if an opening force is forcibly applied to the lid at a closed position.

In order to achieve the object, according to a first aspect of the present invention, there is provided a lid opening and closing device for a vehicle comprising a lid that is pivotably supported on a vehicle body exterior plate, a case that is mounted on the vehicle body exterior plate, a rod that can move forward and backward between a pushed-in position in response to the lid being pushed in and a protruding position when the lid is in an open state, the rod being supported on the case so that the rod can attain a lid closed position at which the rod returns from the pushed-in position toward the protruding position side only by a predetermined amount of movement when the lid is in a closed state, an urging member that urges the rod from the pushed-in position toward the protruding position side and is provided between the case and the rod, an axial position-restricting groove that has a pin-receiving portion facing the protruding position side and is formed on the rod or on a coupling member axially relatively non-movably linked to the rod, and a rod axial direction restricting mechanism comprising the axial position-restricting groove and an elastic member that has a pin inserted into the axial position-restricting groove while being capable of being received by the pin-receiving portion in a state in which the rod is at the lid closed position and that exhibits a resilient force making the pin resiliently abut against the rod or the coupling member, the rod axial direction restricting mechanism restricting an axial position of the rod while enabling the pin to be disengaged from the pin-receiving portion in response to an operation of pushing in the lid in a closed state, the case being provided with a restricting part restricting displacement of the elastic member to a side on which the pin is disengaged from the axial position-restricting groove, and the restricting part being capable of abutting against the elastic member.

In accordance with the first aspect of the present invention, even when an opening force is forcibly applied to the lid at the closed position, since the elastic member is restricted from being displaced toward the side on which the pin is disengaged from the axial position-restricting groove due to the restricting part provided on the case abutting against the elastic member, the pin will not be disengaged from the axial position-restricting groove, thus enhancing the theft resistance.

According to a second aspect of the present invention, in addition to the first aspect, the coupling member is a holder that is relatively rotatably but axially relatively non-movably fitted on the rod and in which the axial position-restricting groove is formed, and the holder has formed thereon a guide part guiding the pin to the axial position-restricting groove.

In accordance with the second aspect of the present invention, since the guide part guiding the pin toward the axial position-restricting groove is formed on the holder having the axial position-restricting groove formed therein, even in a state in which the elastic member is assembled on the case the pin can easily be inserted into the axial position-restricting groove, thus enhancing the ease of assembly.

The above and other objects, characteristics and advantages of the present invention will be clear from detailed descriptions of the preferred embodiment which will be provided below while referring to the attached drawings.

DESCRIPTION OF THE PREFERRED EMBODIMENT

Figure 1:
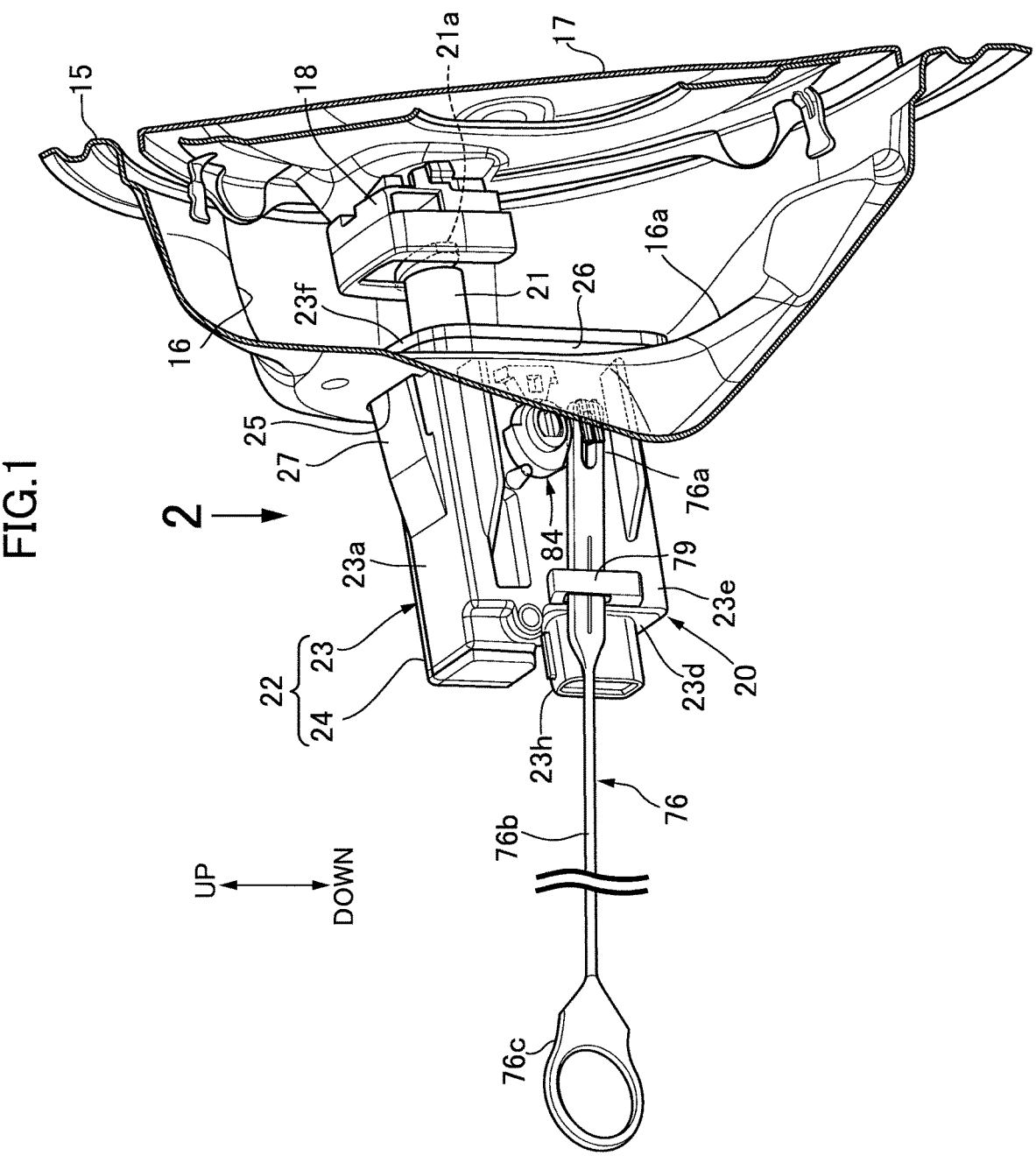
FIG. 1 is a perspective view showing a state in which a lid opening and closing device is mounted with a vehicle body exterior plate cut away.
Figure 2:
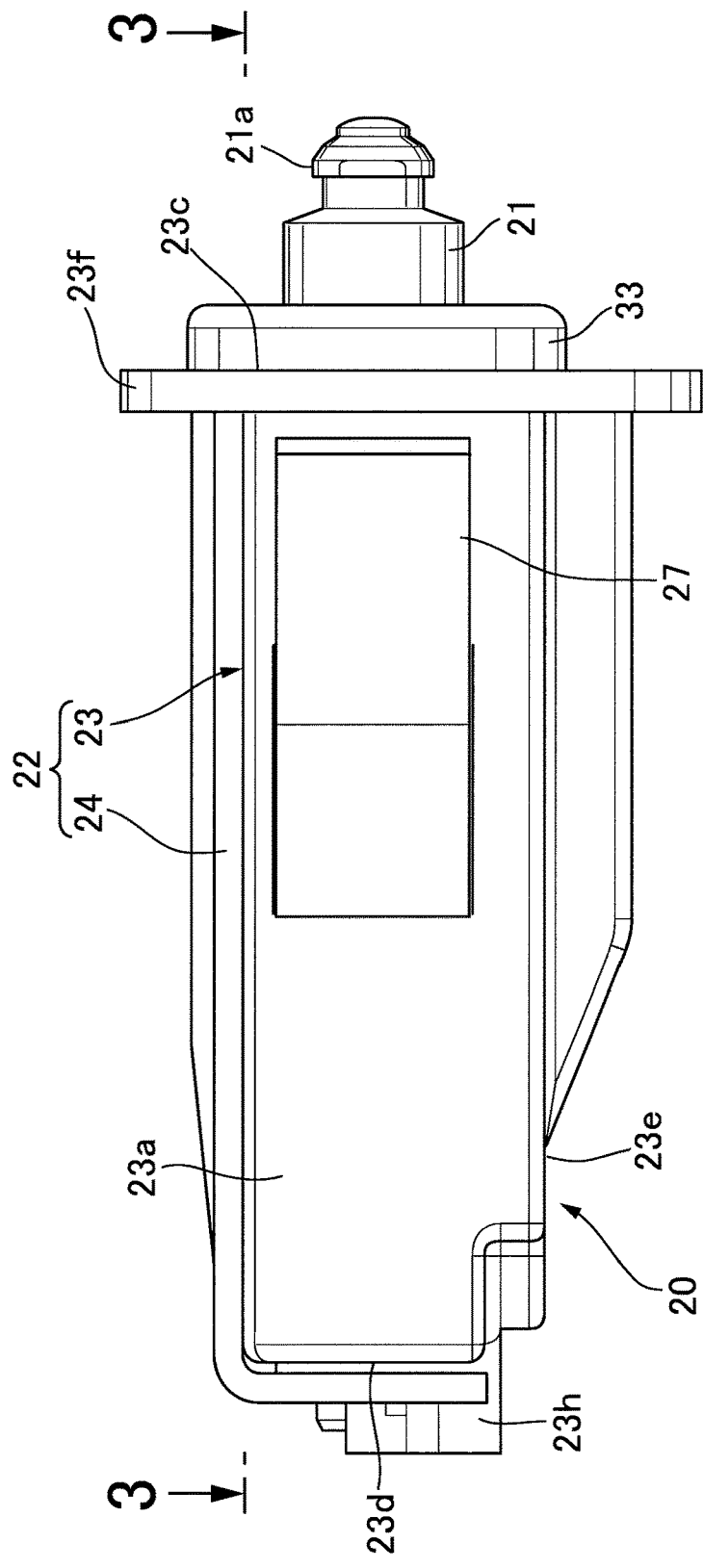
FIG. 2 is a plan view of the lid opening and closing device from the direction of arrow 2 in FIG. 1 when a rod is at a lid closed position.

An embodiment of the present invention is explained by reference to FIG. 1 to FIG. 19; first, in FIG. 1, a recess part 16 is formed in a vehicle body exterior plate 15 of a vehicle, a fuel supply part, which is not illustrated, facing the recess part 16, and a base end part of a lid 17 is pivotably supported on the vehicle body exterior plate 15, the lid 17 openably and closably closing the recess part 16. A latching part 18 is provided on an inner face on the free end side of the lid 17, and a case 22 of a lid opening and closing device 20 is mounted on a bottom wall 16a of the recess part 16, the lid opening and closing device 20 having a rod 21 having provided on its extremity part an engagement portion 21a that detachably engages with the latching part 18. That is, the lid 17 is pivotably supported on the vehicle body exterior plate 15 and the case 22 is mounted thereon.

Referring in addition to FIG. 2 to FIG. 6, the case 22 is formed from a case main body 23 formed into a rectangular box shape and a cover 24 joined to the case main body 23 so as to close an open end of the case main body 23.

The case main body 23 integrally has an upper side wall 23a and lower side wall 23b extending in the vehicle width direction with a gap therebetween in the up-down direction, an outer side wall 23c extending in the up-down direction while joining end parts on the outer side in the vehicle width direction of the upper and lower side walls 23a, 23b, an inner side wall 23d extending in the up-down direction while joining end parts on the inner side in the vehicle width direction of the upper and lower side walls 23a, 23b, and a flat plate-shaped end wall 23e connectedly provided in common on end parts on one side in the vehicle fore-and-aft direction of the upper side wall 23a, the lower side wall 23b, the outer side wall 23c, and the inner side wall 23d. The cover 24 is joined to the case main body 23 from the other side in the vehicle fore-and-aft direction so as to oppose the end wall 23e.

A rectangular insertion hole 25 (see FIG. 1) is formed in the bottom wall 16a of the recess part 16, and the case 22 is inserted into the insertion hole 25 from the outer side in the vehicle width direction. Moreover, a rectangular collar portion 23f is integrally and connectedly provided with the outer side wall 23c of the case main body 23 so as to protrude outward from the outer periphery thereof, and the case 22 is inserted into the insertion hole 25 from the outer side in the vehicle width direction so that a rectangular inner seal member 26 surrounding an end part, on the collar portion 23f side, of the case 22 is disposed between the collar portion 23f and an outer face of the bottom wall 16a at the peripheral edge part of the insertion hole 25. A base end part of an elastic claw 27 is connectedly provided on the upper side wall 23a and the lower side wall 23b of the case main body 23, the elastic claw 27 passing through the insertion hole 25 due to it flexing when the case 22 is inserted into the insertion hole 25, and an extremity part of the elastic claw 27 abutting against an inner face of the bottom wall 16a. That is, the inner seal member 26 and the bottom wall 16a are clamped between the collar portion 23f and the elastic claw 27, thereby mounting the case 22 on the bottom wall 16a.

The lid opening and closing device 20 includes the rod 21, a restriction member 28 that can restrict movement of the rod 21, and an electric motor 29 that drives the restriction member 28, the restriction member 28 and the electric motor 29 being housed within the case 22.

The rod 21 is disposed so as to extend in the vehicle width direction in an upper part of the case 22 and is movably supported on the case main body 23 of the case 22. A support rib 31 extends in the longitudinal direction of the rod 21 and is integrally and projectingly provided on an inner face of the end wall 23e of the case main body 23, the support rib 31 having on the protruding end a sliding contact support face 30 that is recessed into an arc shape so as to be in sliding contact with part of an outer peripheral face of the rod 21, which has a circular cross section. A through hole 32 is formed in an upper part of the outer side wall 23c of the case main body 23, the rod 21 being axially movably inserted through the through hole 32, a short cylindrical portion 23g protruding from the outer side wall 23c toward the recess part 16 side so as to form part of the through hole 32 is integrally and projectingly provided on the upper part of outer side wall 23c, and an annular outer seal member 33 is fitted onto the short cylindrical portion 23g, the outer seal member 33 being in resilient sliding contact with the outer periphery of the rod 21.

A holder 35 as a coupling member axially relatively non-movably linked to the rod 21 is linked to the rod 21 within the case 22, and the holder 35 is relatively rotatably but axially relatively non-movably fitted onto the rod 21.

Figure 7:
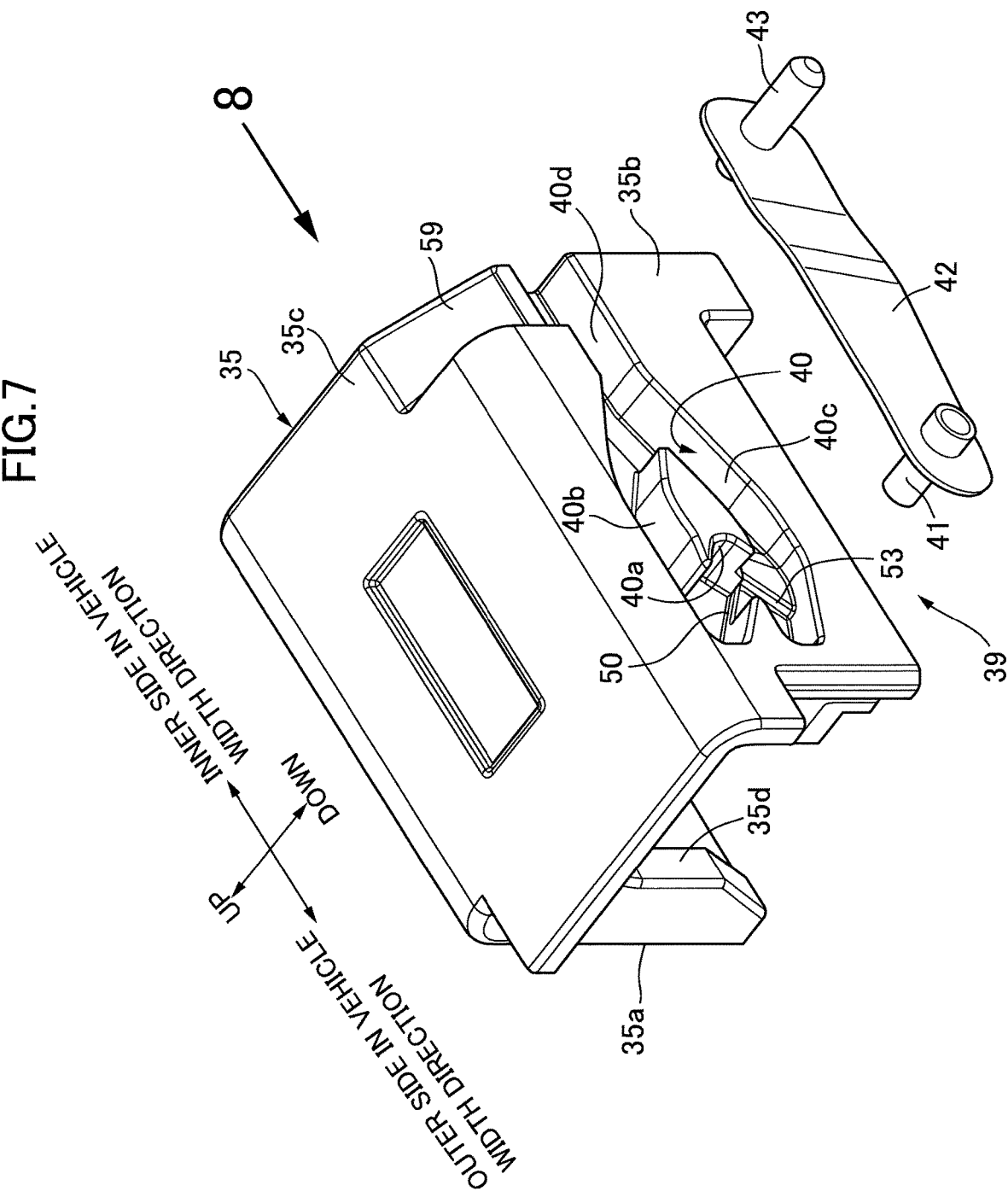
FIG. 7 is an exploded perspective view of a holder and an elastic member having a pin provided thereon.
Figure 8:
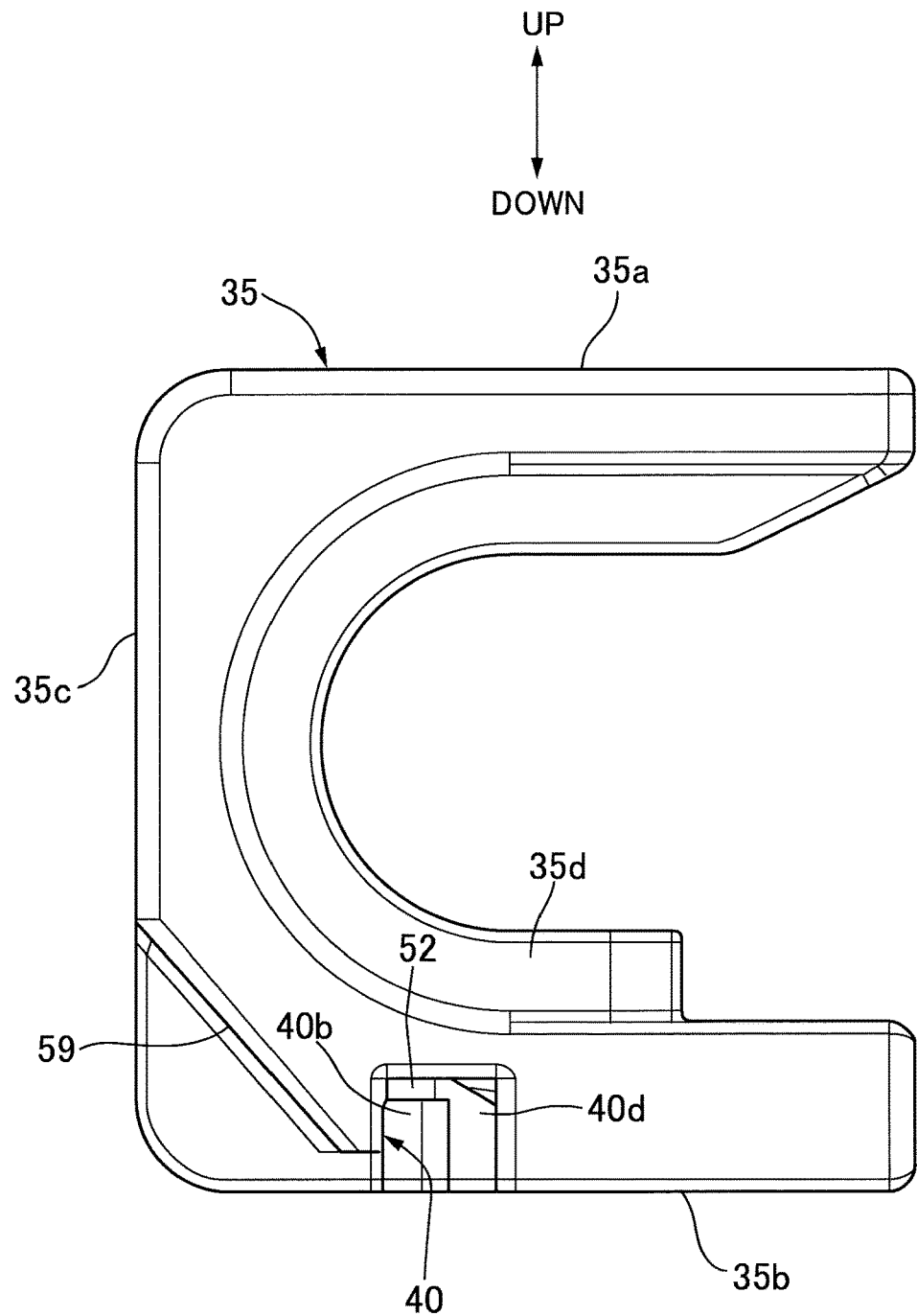
FIG. 8 is a view in the direction of arrow 8 in FIG. 7.
Figure 9:
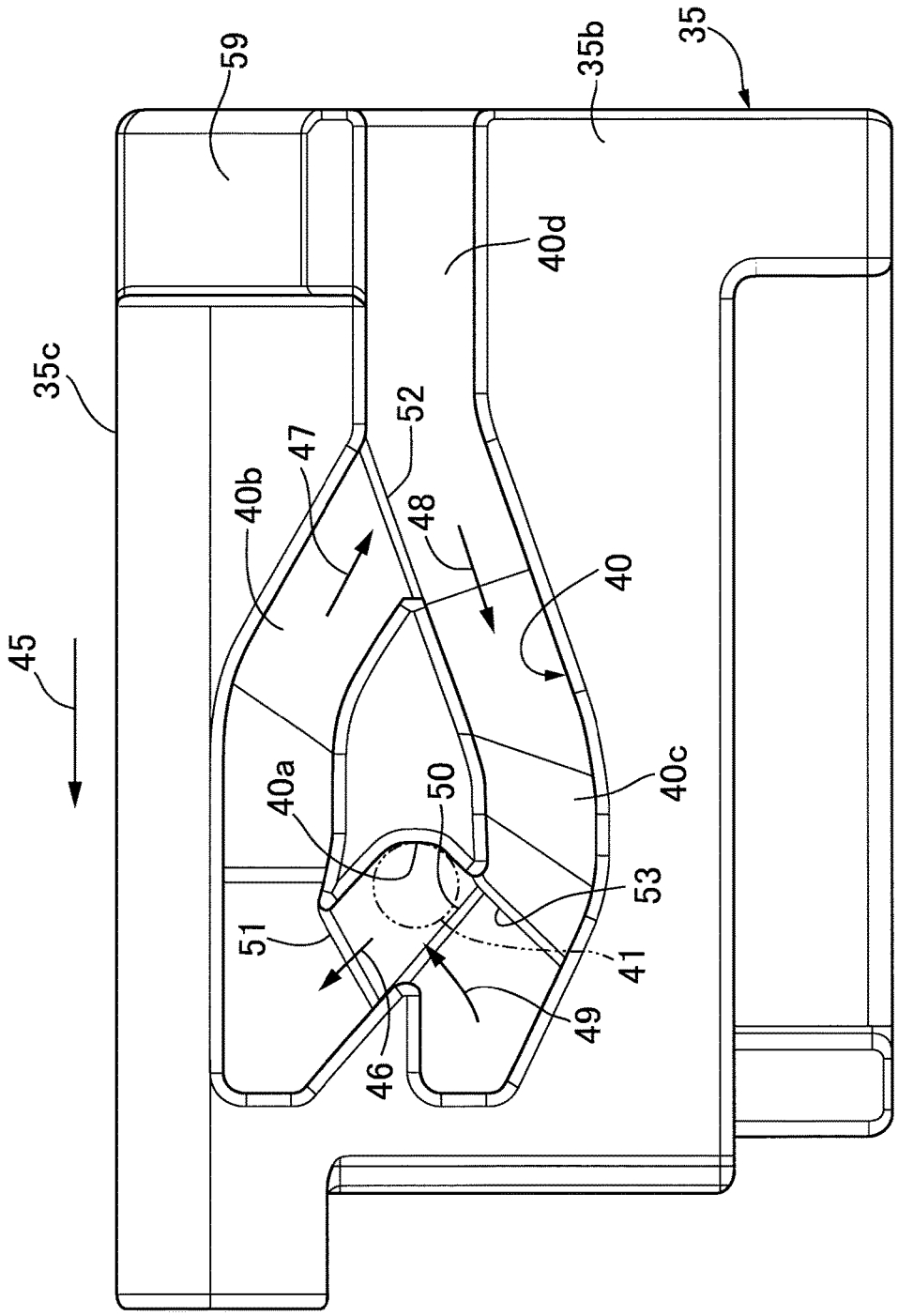
FIG. 9 is a view in the direction of arrow 9 in FIG. 8.

Referring in addition to FIG. 7 to FIG. 9, the holder 35 is formed so as to have a substantially U-shaped cross-sectional shape opening on the end wall 23e side while integrally having an upper wall portion 35a that is in sliding contact with an inner face of the upper side wall 23a of the case main body 23 of the case 22, a lower wall portion 35b that is disposed in parallel with and beneath the upper wall portion 35a across a gap, and a vertical wall portion 35c that provides a link between the upper wall portion 35a and the lower wall portion 35b while opposing the end wall 23e of the case main body 23 at a position spaced from the end wall 23e.

An annular groove 36 is formed in a portion, corresponding to the holder 35, of the outer periphery of the rod 21, and an engagement projection portion 35d engaging with the annular groove 36 is formed integrally with the holder 35. The holder 35 is thereby fitted onto the rod 21 so that it can pivot relative thereto within a limited range around the axis of the rod 21 while being unable to move relative to the rod 21 in the axial direction.

A ring-shaped spring housing recess part 37 is formed in the rod 21 at a location close to the inner side wall 23d of the case main body 23 so as to be coaxial with the axis of the rod 21 and open on the inner side wall 23d side, and a coil spring 38 as an urging member partially housed within the spring housing recess part 37 is provided between the rod 21 and the inner side wall 23d. The rod 21 is urged, by the resilient force of the coil spring 38, in a direction in which the engagement portion 21a on its extremity part protrudes from the vehicle body exterior plate 15, and in order to restrict the axial position of the rod 21 an axial position-restricting groove 40 is formed in a lower wall portion 35b of the holder 35, a pin 41 being inserted into the axial position-restricting groove 40.

A plate spring 42, which is an elastic member, is disposed between the holder 35 and the electric motor 29 so as to extend lengthwise in the longitudinal direction of the rod 21, a shaft 43 inserted into a base end part of the plate spring 42 is clamped between the case main body 23 and the cover 24, and the plate spring 42 is supported on the case 22 via the shaft 43 so that it can pivot within a permitted range within the case 22.

The pin 41 is fixed close to the free end part of the plate spring 42, and a projecting part 44 is projectingly provided on the case main body 23, the projecting part 44 abutting against a location close to the base end part of the plate spring 42 from the side opposite to the rod 21. The plate spring 42 thereby exhibits a resilient force that makes the pin 41 abut against the holder 35.

The axial position of the rod 21 is restricted by a rod axial direction restricting mechanism 39 that is formed from the plate spring 42 having the pin 41 and the axial position-restricting groove 40 of the holder 35.

Figure 10:
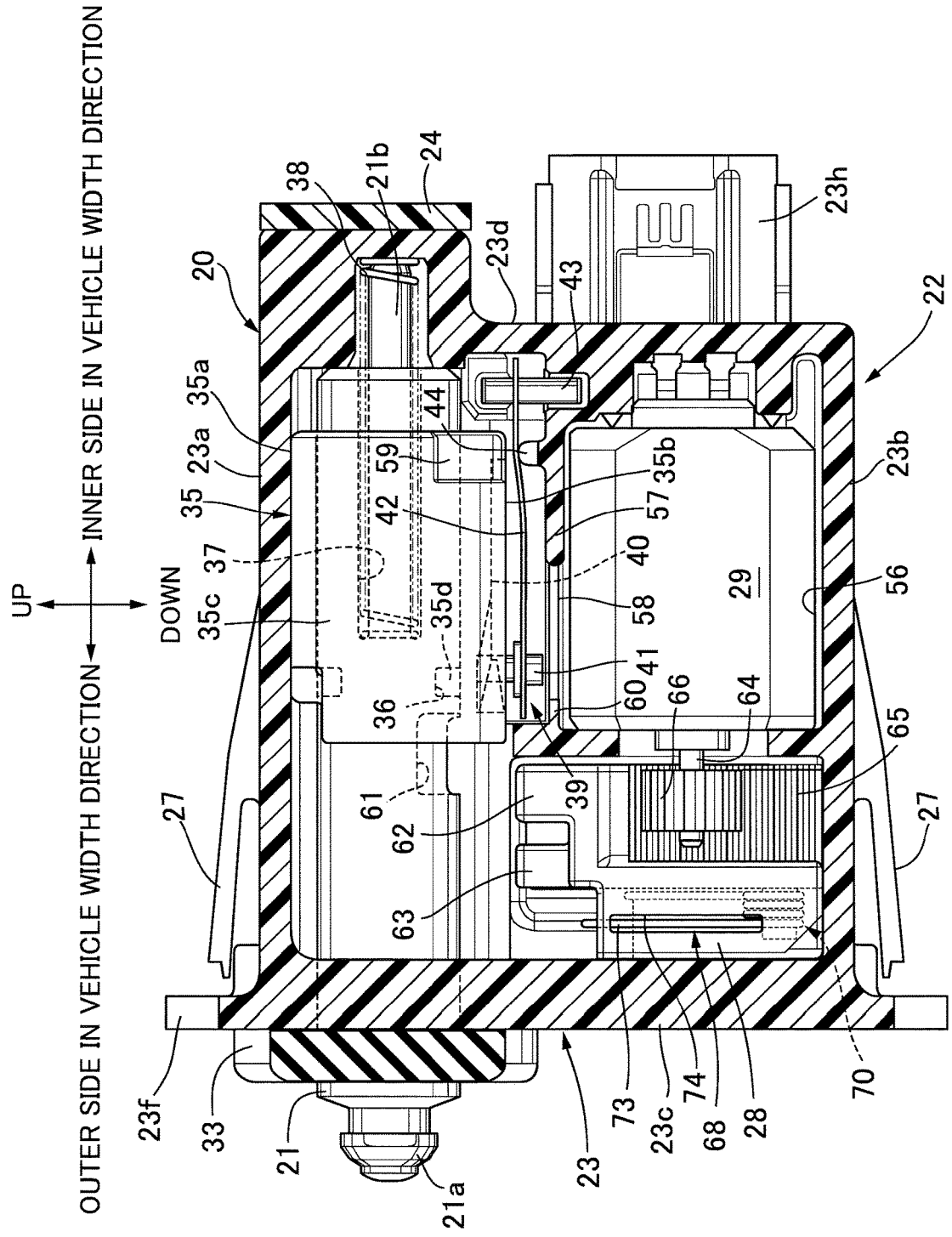
FIG. 10 is a sectional view, corresponding to FIG. 3, of the lid opening and closing device in a state in which the rod is at a pushed-in position.
Figure 11:
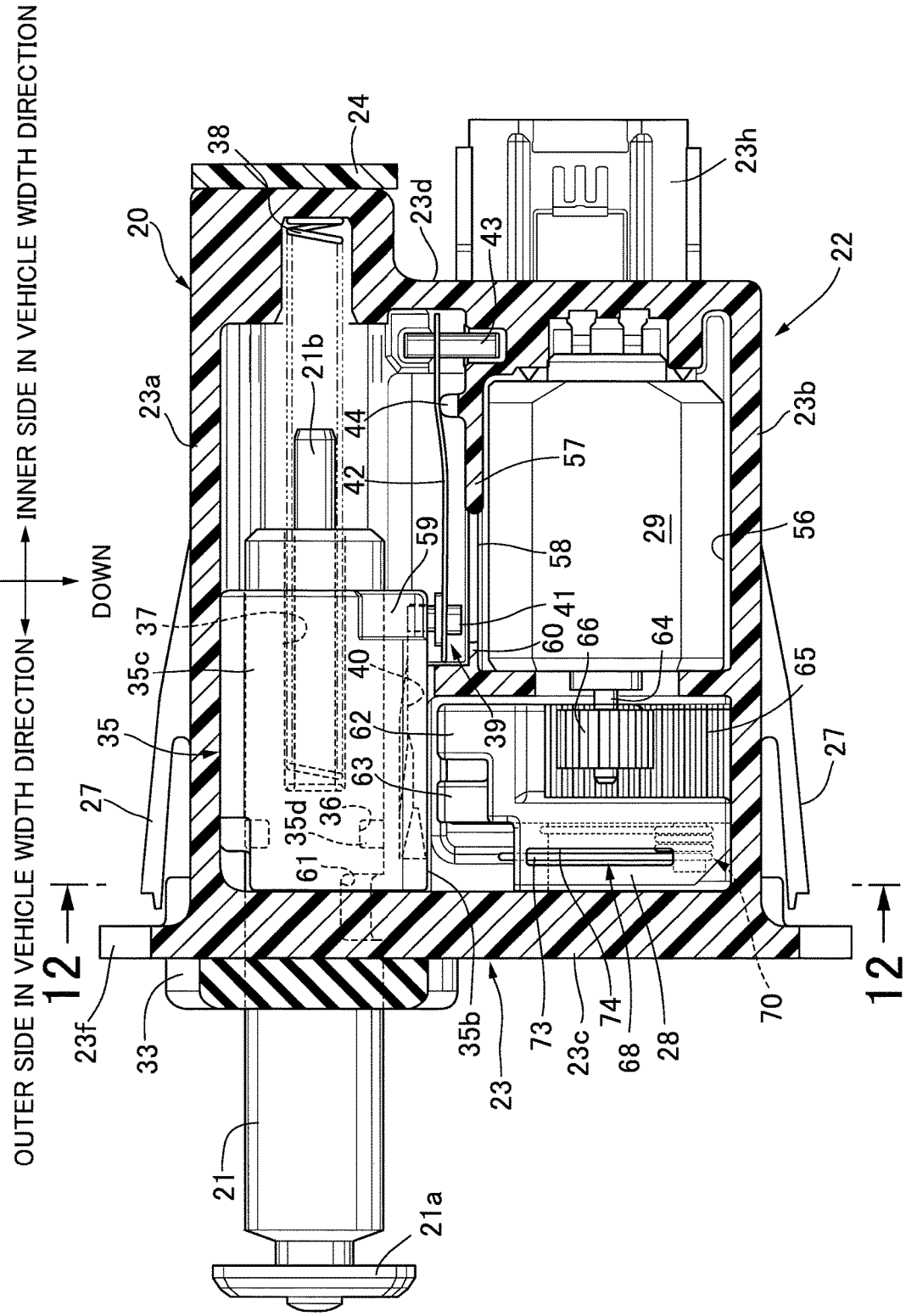
FIG. 11 is a sectional view, corresponding to FIG. 3, of the lid opening and closing device in a state in which the rod is at a protruding position.

The rod 21 is capable of moving forward and backward between a pushed-in position in which it is pushed in against the resilient force of the coil spring 38 as shown in FIG. 10 in response to the lid 17 in a closed state and an open state being pushed in, and a protruding position in which it is made to protrude greatly from the case 22 by means of the resilient force of the coil spring 38 as shown in FIG. 11 when the lid 17 is in the open state and, moreover, when the lid 17 is in the closed state the rod 21 attains, as shown in FIG. 2, FIG. 3, FIG. 4, and FIG. 6, a lid closed position in which it returns from the pushed-in position toward the protruding position side only by a predetermined amount of movement.

A round bar-shaped stopper 21b is coaxially, integrally, and projectingly provided on the rod 21 in an end part on the inner side wall 23d side of the case main body 23, and when as shown in FIG. 10 the rod 21 is in the pushed-in position the stopper 21b abuts against the inner side wall 23d of the case main body 23 and restricts the movement end of the rod 21 in the pushing-in direction. The holder 35 functions to restrict the protruding position of the rod 21, and the holder 35 is mounted on the rod 21 so that in a state in which the rod 21 is in the protruding position, as shown in FIG. 11 the holder 35 abuts against the outer side wall 23c of the case main body 23 and restricts the movement end of the rod 21 in the protrusion direction.

Referring to FIG. 9, the axial position-restricting groove 40 is formed so as to have: a pin-receiving portion 40a that is formed to face the protruding position side of the rod 21 so as to abut against the pin 41 in a direction along an urging direction shown by arrow 45 in order to prevent the rod 21 from moving to the protruding position by receiving, with the pin 41, the holder 35 urged in the urging direction together with the rod 21 by means of the coil spring 38 when the rod 21 is in the lid closed position; first and second pushed-in position-receiving portions 40b, 40c that receive the pin 41 when the rod 21 and the holder 35 are in the pushed-in position; and a protruding position-receiving portion 40d that receives the pin 41 when the rod 21 and the holder 35 are in the protruding position.

When the lid 17 in the closed position is pushed in, the pin 41 is displaced as shown by an arrow 46 from the pin-receiving portion 40a to the first pushed-in position-receiving portion 40b by means of movement of the rod 21 and the holder 35 to the pushed-in position, and when the rod 21 and the holder 35 are moved to the protruding position due to release of a force pushing in the lid 17 the pin 41 is displaced as shown by an arrow 47 from the first pushed-in position-receiving portion 40b to the protruding position-receiving portion 40d. When the rod 21 is pushed in together with the lid 17 in a state in which the lid 17 is in the open position, the pin 41 is displaced as shown by an arrow 48 to the second pushed-in position-receiving portion 40c due to movement of the rod 21 and the holder 35 to the pushed-in position, and when the rod 21 and the holder 35 are moved to the lid closed position due to release of a force pushing in the lid 17, the pin 41 is displaced as shown by an arrow 49 from the second pushed-in position-receiving portion 40c to the pin-receiving portion 40a, and abuts against the pin-receiving portion 40a.

Formed in the axial position-restricting groove 40 are a first step part 50 that prevents reverse displacement of the pin 41 from the pin-receiving portion 40a to the second pushed-in position-receiving portion 40c, a second step part 51 that prevents reverse displacement of the pin 41 from the first pushed-in position-receiving portion 40b to the pin-receiving portion 40a, a third step part 52 that prevents reverse displacement of the pin 41 from the protruding position-receiving portion 40d to the first pushed-in position-receiving portion 40b, and a fourth step part 53 that prevents reverse displacement of the pin 41 from the second pushed-in position-receiving portion 40c to the protruding position-receiving portion 40d.

Formed on the holder 35 is a guide part 59 guiding the pin 41 of the plate spring 42 to the axial position-restricting groove 40. The guide part 59 is formed on a lower part of an end part, on the inner side in the vehicle width direction, of the vertical wall portion 35c of the holder 35, and is formed as an inclined face that becomes closer to the protruding position-receiving portion 40d of the axial position-restricting groove 40 in going downward. The guide part 59 works to guide the pin 21 when assembling the holder 35 to the case main body 23 side in a state in which the shaft 43 in the base end part of the plate spring 42 is assembled on the case main body 23 of the case 22, and the pin 21 is inserted into the protruding position-receiving portion 40d of the axial position-restricting groove 40 by being guided by the guide part 59.

The engagement portion 21a in the extremity part of the rod 21 has a substantially T-shaped form; in a state in which the lid 17 is in the closed position the engagement portion 21a is engaged with the latching part 18 and when the lid 17 is opened the engagement with the latching part 18 is released; due to the rod 21 spinning on its axis by 90 degrees the engagement portion 21a is switched between engagement with the latching part 18 and release of the engagement.

Figure 6:
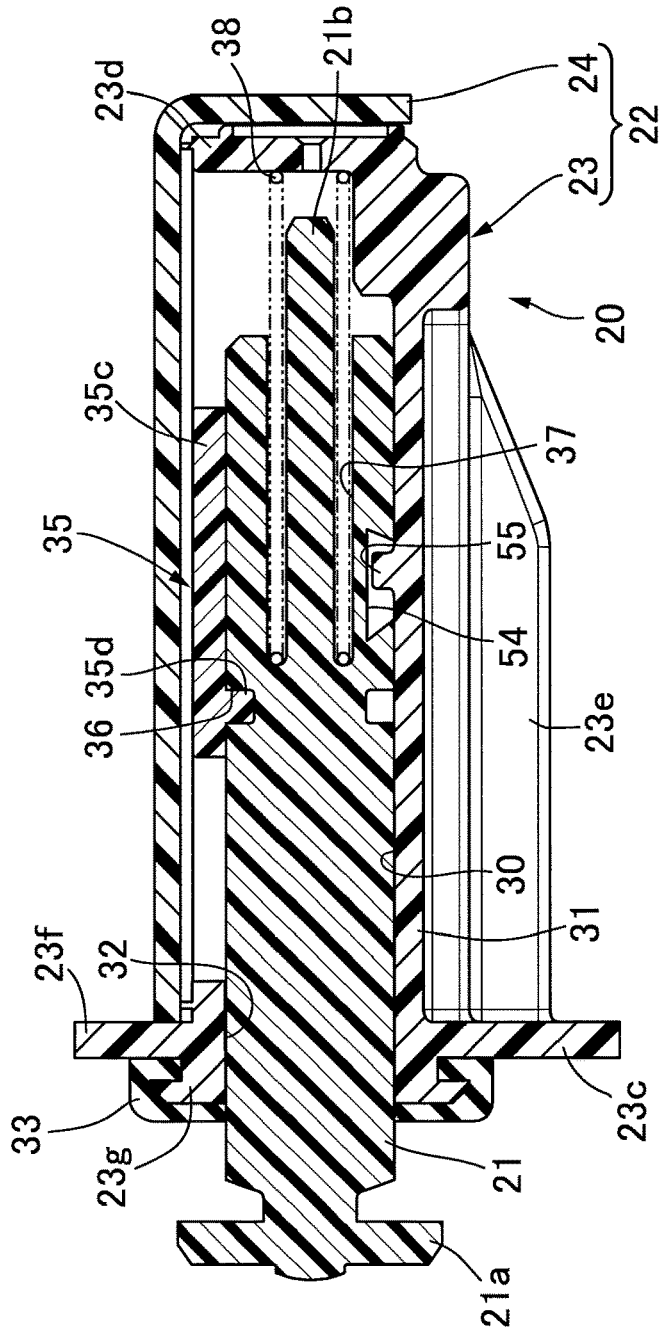
FIG. 6 is a sectional view along line 6-6 in FIG. 3.

Referring to FIG. 6, a helical guide groove 54 is formed in an outer periphery of the rod 21 that faces the end wall 23e side of the case main body 23, and a projection 55 projecting into the guide groove 54 is integrally and projectingly provided on the end wall 23e of the case main body 23. The guide groove 54 is formed so as to make the rod 21 spin on its axis by 90 degrees while the rod 21 moves in the axial direction between the pushed-in position and the protruding position.

The electric motor 29 has a rotational axis parallel to the axis of the rod 21, and is housed within the case 22 so as to be disposed toward said inner side of the case main body 23 beneath the rod 21 and the holder 35. Integrally and projectingly provided on the case main body 23 is a substantially L-shaped dividing wall 57 that forms, in cooperation with the inner side wall 23d and the lower side wall 23b, a motor housing recess part 56 housing the electric motor 29. Moreover, formed in the dividing wall 57 is an opening 58 that can house part of the pin 41 fixed to the plate spring 42. Formed integrally with the inner side wall 23d is a connector portion 23h connected to the electric motor 29.

Provided on the case 22 is a restricting part 60 that restricts displacement of the plate spring 42 toward the side on which the pin 41 is disengaged from the axial position-restricting groove 40. In this embodiment, the restricting part 60 protruding into the opening 58 is provided integrally with the case main body 23 of the case 22 so that it can abut against a free end part of the plate spring 42 from the side opposite to the holder 35.

Figure 3:
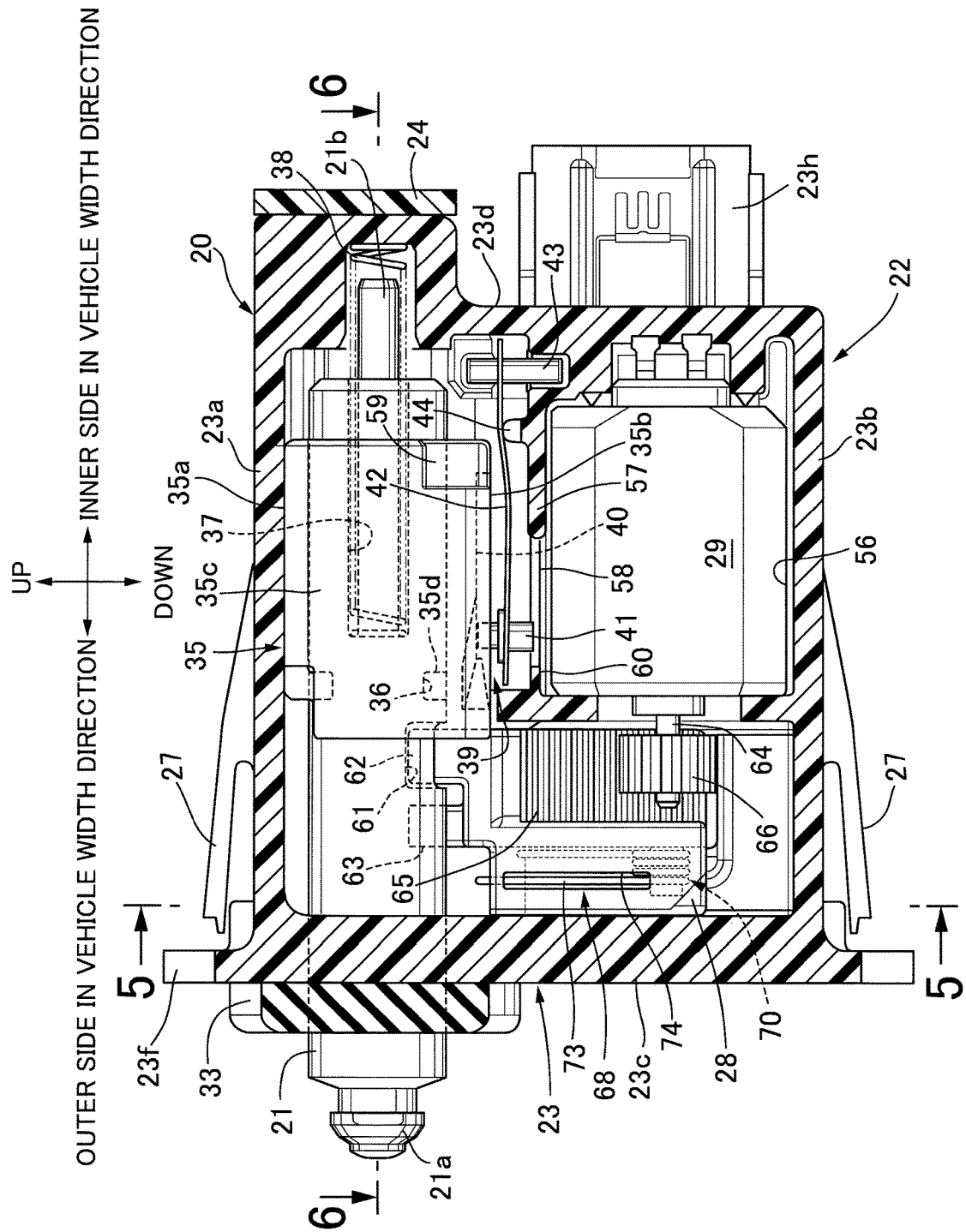
FIG. 3 is a sectional view along line 3-3 in FIG. 2 when a door is in a locked state.
Figure 4:
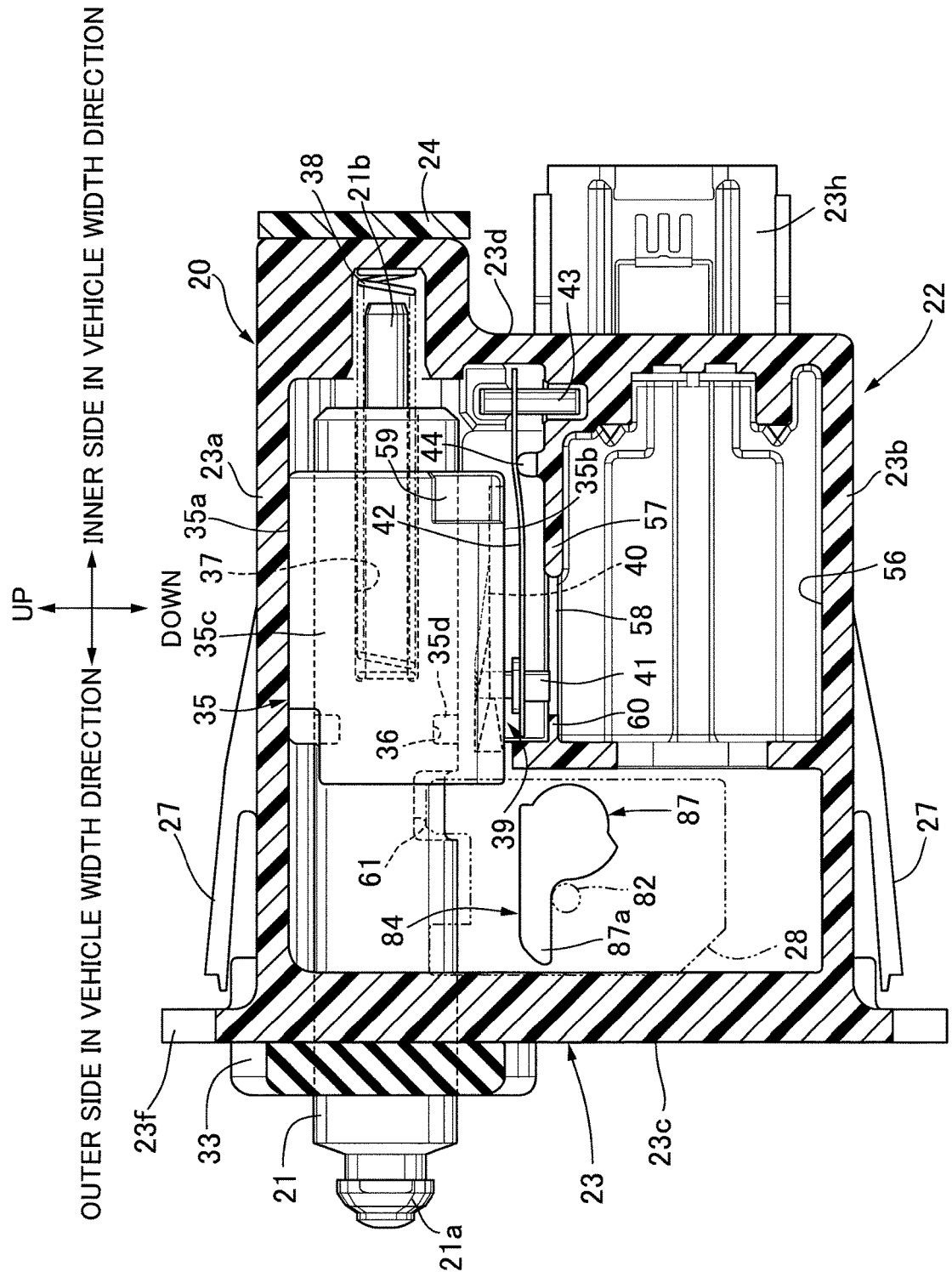
FIG. 4 is a sectional view, corresponding to FIG. 3, in a state in which an electric motor and a restriction member are removed.
Figure 5:
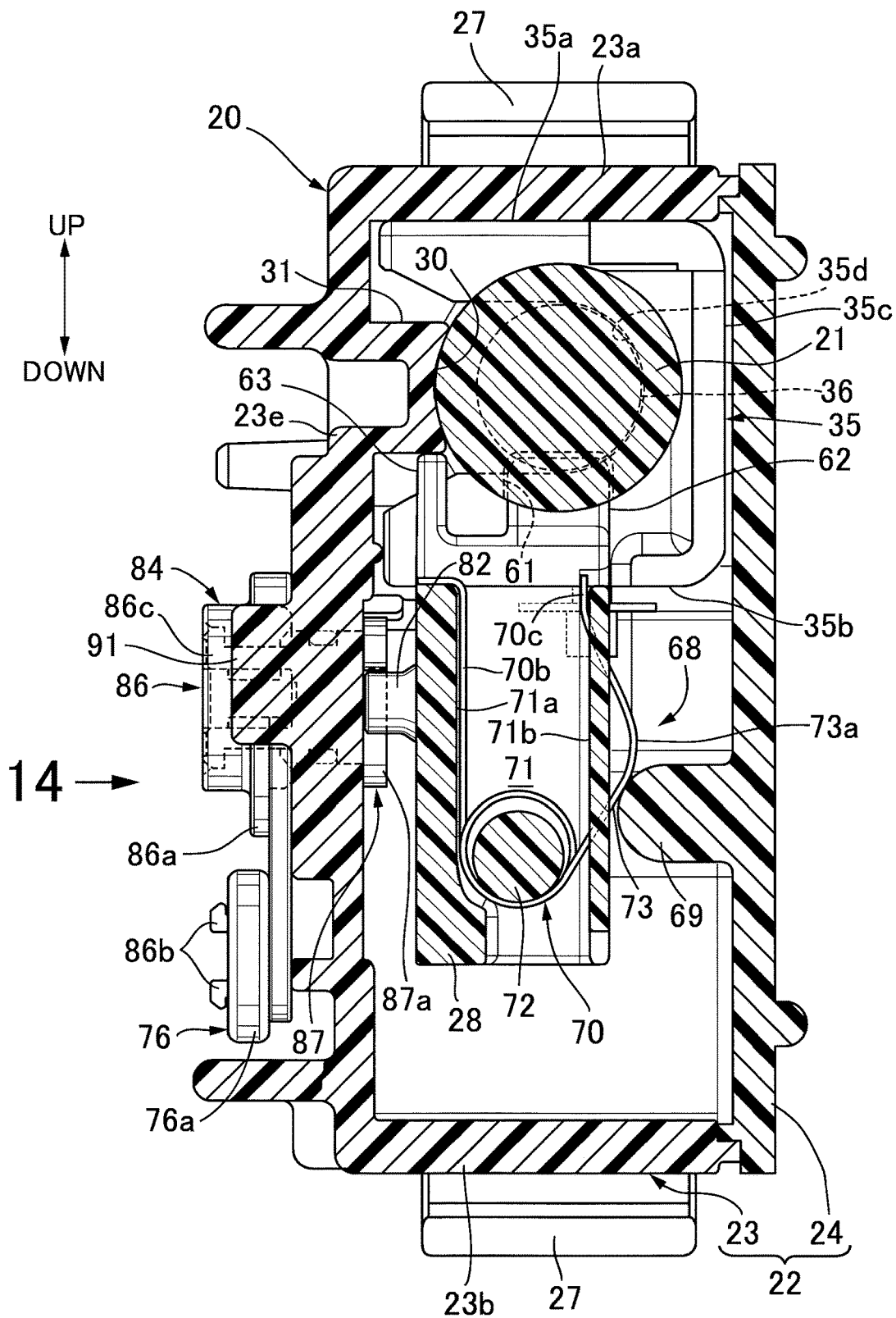
FIG. 5 is a sectional view along line 5-5 in FIG. 3.
Figure 12:
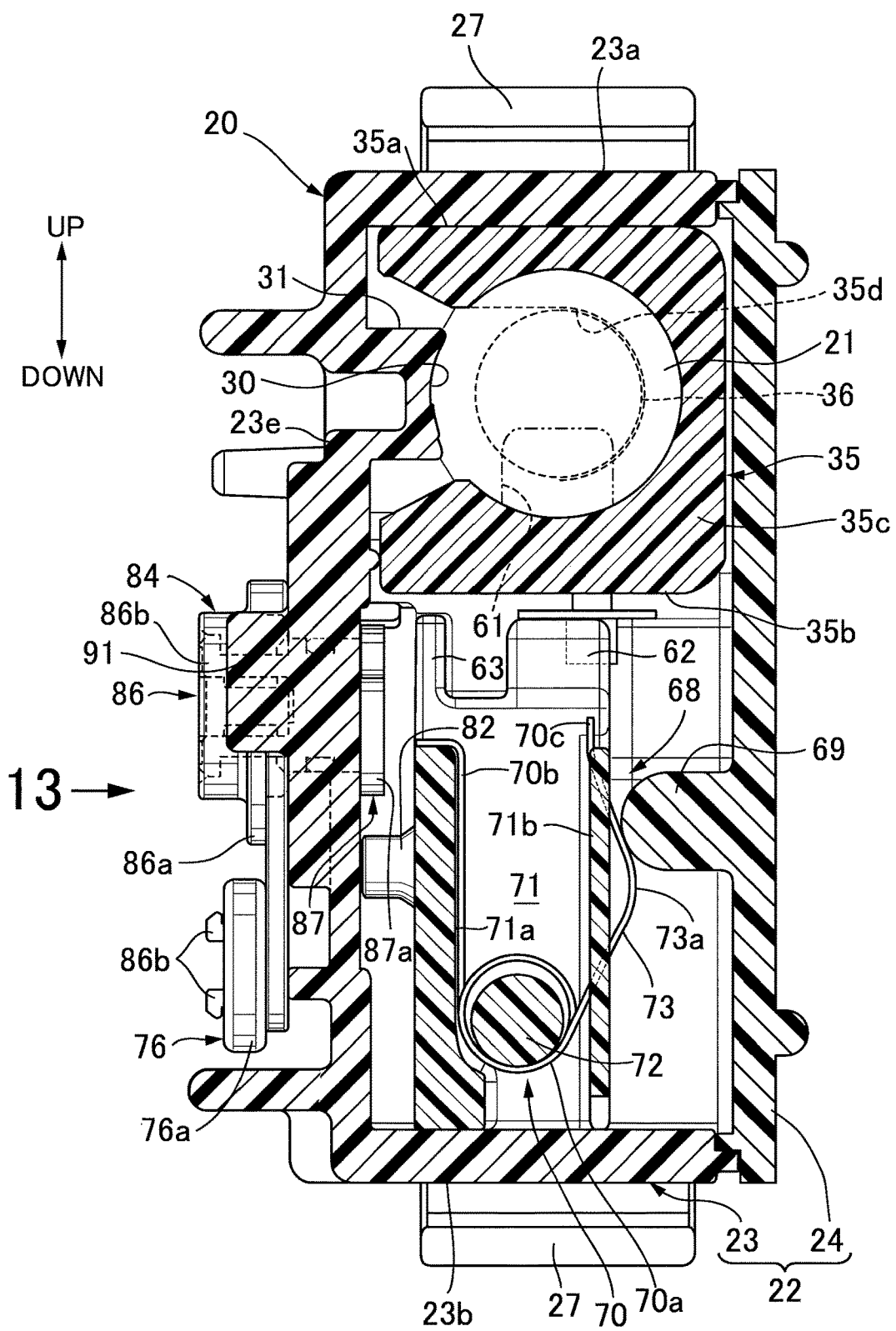
FIG. 12 is a sectional view along line 12-12 in FIG. 11.

The restriction member 28 is housed within the case 22 so as to be disposed beneath the rod 21 and holder 35 further outside in the vehicle width direction than the electric motor 29, and is housed in the case 22 so as to operate in a direction orthogonal to the direction of forward and backward movement of the rod 21, that is, in the up-down direction in this embodiment, between a restriction position as shown in FIG. 3 and FIG. 5 in which it engages with the rod 21 in the lid closed position and restricts movement of the rod 21 and a restriction release position as shown in FIG. 10, FIG. 11, and FIG. 12 in which it releases engagement with the rod 21, moves to the side away from the rod 21, and releases restriction of the rod 21.

A latching recess part 61 facing the restriction member 28 side when rod 21 is in the lid closed position is formed in the outer periphery of the rod 21, and an engagement projection 62 that is fitted into and engaged with the latching recess part 61 when the rod 21 is in the lid closed position is projectingly provided on an end part, on the rod 21 side, of the restriction member 28. A stopper 63 is integrally and projectingly provided on the end part, on the rod 21 side, of the restriction member 28, the stopper 63 determining the restriction position of the restriction member 28 by abutting against the support rib 31 projectingly provided on the inner face of the end wall 23e as shown in FIG. 5 when the restriction member 28 moves to the restriction position in a state in which the rod 21 is in the lid closed position.

An output shaft 64 of the electric motor 29 has an axis parallel to the axis of the rod 21, that is, orthogonal to the direction of operation of the restriction member 28, and rotatably extends through the dividing wall 57 and protrudes on the restriction member 28 side. On the other hand, a rack 65 is provided on the restriction member 28 so as to extend along the direction of movement thereof, and a pinion 66 provided on the output shaft 64 meshes with the rack 65. The restriction member 28 is therefore driven so as to operate between the restriction position and the restriction release position by means of operation of the electric motor 29.

The electric motor 29 operates only for a predetermined time (e.g. 0.6 sec) in response to the vehicle door being switched between the locked state and the unlocked state by means of a keyless button operation of a vehicle user or a smart entry system; the electric motor 29 drives the restriction member 28 to the restriction position when the door is in the locked state, and the electric motor 29 drives the restriction member 28 to the restriction release position when the door is in the unlocked state.

Figure 13:
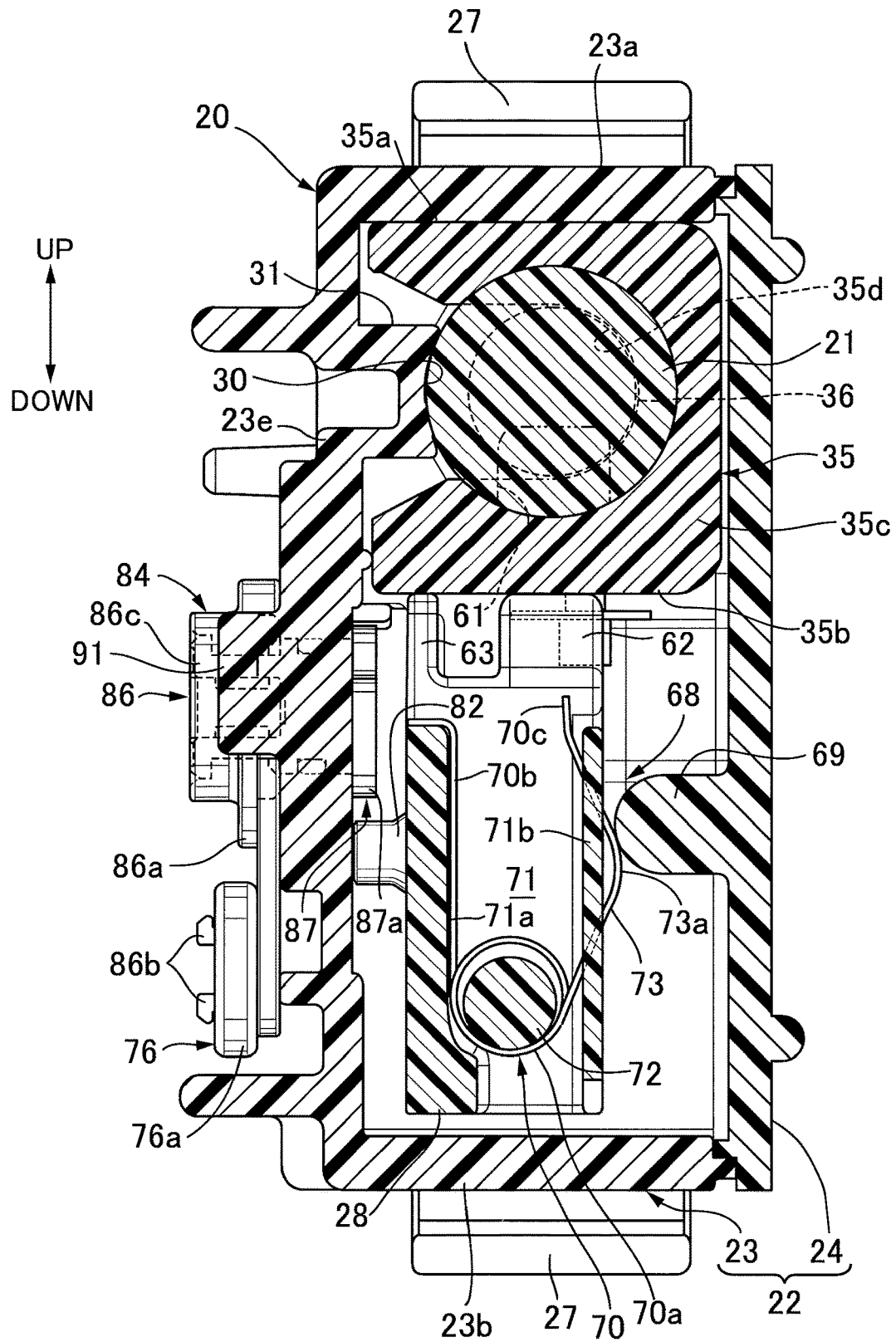
FIG. 13 is a sectional view, corresponding to FIG. 12, when the door attains a locked state in a state in which the rod is at the protruding position.

In a state in which the rod 21 is in the protruding position, that is, a state in which the lid 17 is open, if a vehicle user erroneously puts the door into a locked state, although the restriction member 28 in the restriction release position is driven to the restriction position side by means of the electric motor 29, the restriction member 28 is unable to engage with the rod 21 in the protruding position; as shown in FIG. 13, the engagement projection 62 and the stopper 63 of the restriction member 28 abut against the holder 35 before attaining the restriction position, and movement of the restriction member 28 to the restriction position is thus prevented. Because of this, when operation of the electric motor 29 is stopped, there is a possibility that the restriction member 28 will stop at a halfway position before attaining the restriction position, but the restriction member 28 is returned to the restriction release position by the action of a holding mechanism 68.

The holding mechanism 68 resiliently holds at least the restriction release position of the restriction member 28 and is formed from an abutment part 69 provided integrally with the cover 24 forming part of the case 22, and an elastic member 70 that is mounted on the restriction member 28 while abutting against the abutment part 69 so as to urge the restriction member 28 toward the restriction release position side when the restriction member 28 is at a position where it is partway through moving from the restriction release position toward the restriction position side.

A groove 71 is formed in the restriction member 28 over the entire length along the direction of movement of the restriction member 28, the groove 71 opening on the outer side wall 23c side of the case main body 23, and a support shaft 72 disposed within the groove 71 is integrally and projectingly provided on the restriction member 28. The elastic member 70 has a coil portion 70a surrounding the support shaft 72 and first and second arm portions 70b, 70c extending from opposite ends of the coil portion 70a.

The first arm portion 70b of the elastic member 70 abuts against and is supported on a side wall 71a, which is, among side walls 71a, 71b on opposite sides of the groove 71, further from the cover 24. An extremity part of the second arm portion 70c abuts against and is supported, among the side walls 71a, 71b on opposite sides of the groove 71, on the side wall 71b on the cover 24 side, and an angled elastic part 73 curving so as to bulge on the cover 24 side is formed on an intermediate part of the second arm portion 70c. A slit 74 having the elastic part 73 inserted therethrough is provided in the restriction member 28, the elastic part 73 protruding from the slit 74 toward the cover 24 side.

On the other hand, the abutment part 69 projectingly provided on the cover 24 always abuts against the elastic part 73; in a state in which the restriction member 28 is in the restriction release position, as shown in FIG. 12 the elastic part 73 abuts against the abutment part 69 via a portion further toward the extremity part side of the second arm portion 70c than an angled apex portion 73a, and the elastic part 73 exhibits a resilient force urging the restriction member 28 toward the restriction release position side. In a state in which the restriction member 28 is in the restriction position, as shown in FIG. 5 the elastic part 73 abuts against the abutment part 69 via a portion further toward the side opposite to the extremity part of the second arm portion 70c than the angled apex portion 73a, and the elastic part 73 exhibits a resilient force urging the restriction member 28 toward the restriction position side. When the restriction member 28 is as shown in FIG. 13 in an intermediate position between the restriction position and the restriction release position, without the abutment part 69 overriding the apex portion 73a of the elastic part 73 the elastic part 73 abuts against the abutment part 69 via a portion further on the extremity part side of the second arm portion 70c than the apex portion 73a, and the elastic part 73 exhibits a resilient force urging the restriction member 28 toward the restriction release position side. When the restriction member 28 is driven toward the restriction position side by means of the electric motor 29 and the restriction member 28 attains a halfway position before attaining the restriction position, the restriction member 28 is thereby returned to the restriction release position by the action of the holding mechanism 68 accompanying operation of the electric motor 29 being stopped.

When the electric motor 29 malfunctions, since the lid 17 cannot be opened unless the restriction member 28 restricting the rod 21 in a door closed state is returned to the restriction release position by a manual operation, the lid opening and closing device 20 is provided with an emergency operation member 76 that is capable of moving the restriction member 28 to the restriction release position when the electric motor 29 malfunctions.

Figure 14:
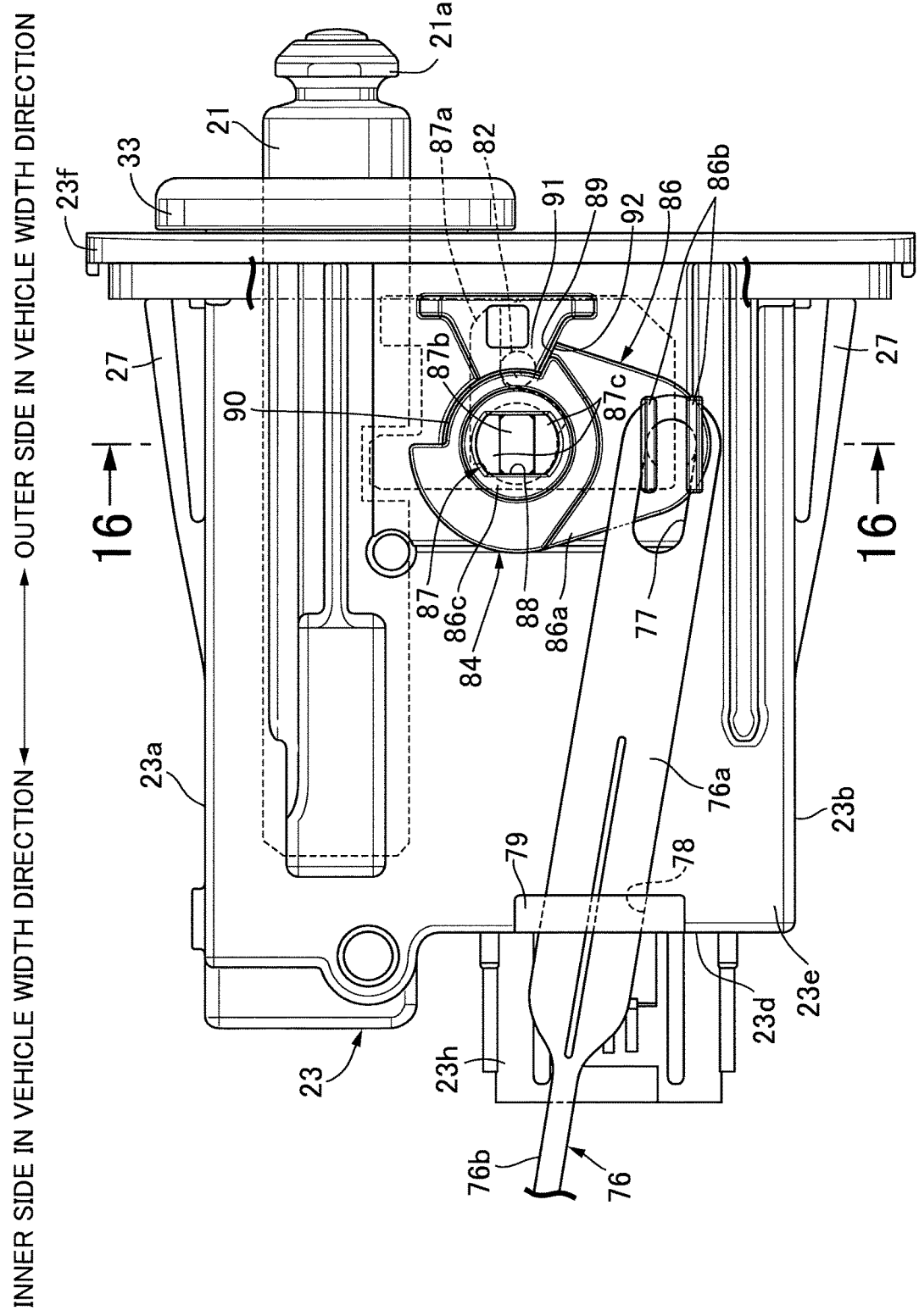
FIG. 14 is a view in the direction of arrow 14 in FIG. 5.
Figure 15:
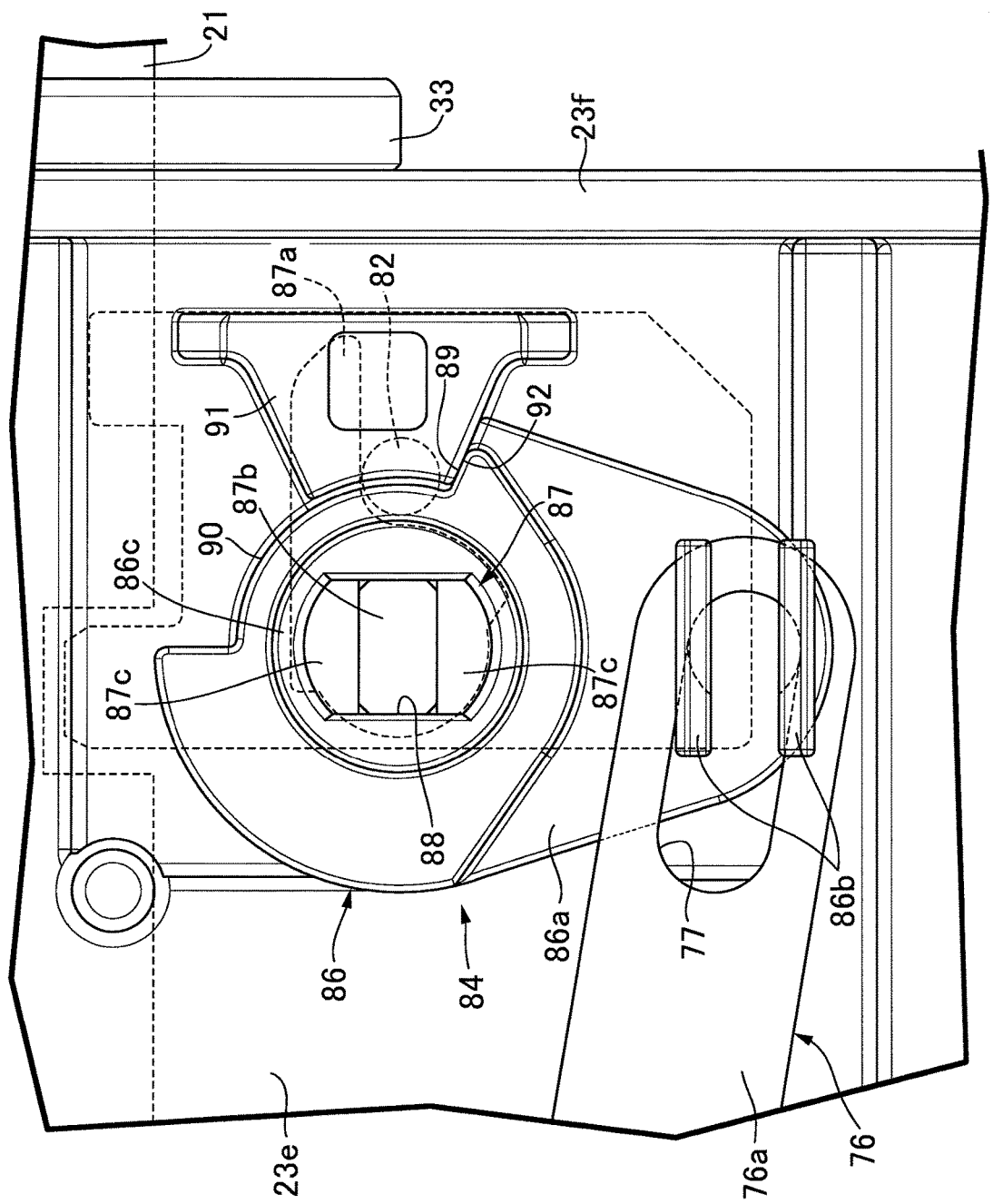
FIG. 15 is an enlarged view of an essential part of FIG. 14.

In FIG. 14 and FIG. 15, the emergency operation member 76 is capable of moving along an outer face of the end wall 23e of the case main body 23 of the case 22, and integrally has a linking portion 76a having an elongated hole-shaped first link hole 77, a rod-shaped portion 76b that is connected integrally to the linking portion 76a, and an operating portion 76c that has a circular hole and is provided on an extremity part of the rod-shaped portion 76b. The rod-shaped portion 76b is inclined so as to be positioned upward in going inward in the vehicle width direction from the linking portion 76a, a guide projecting part 79 having a guide hole 78 into which the linking portion 76a is movably fitted is integrally and projectingly provided on the outer face of the end wall 23e, and the emergency operating member 76 is capable of moving along the longitudinal direction of the rod-shaped portion 76b.

Figure 16:
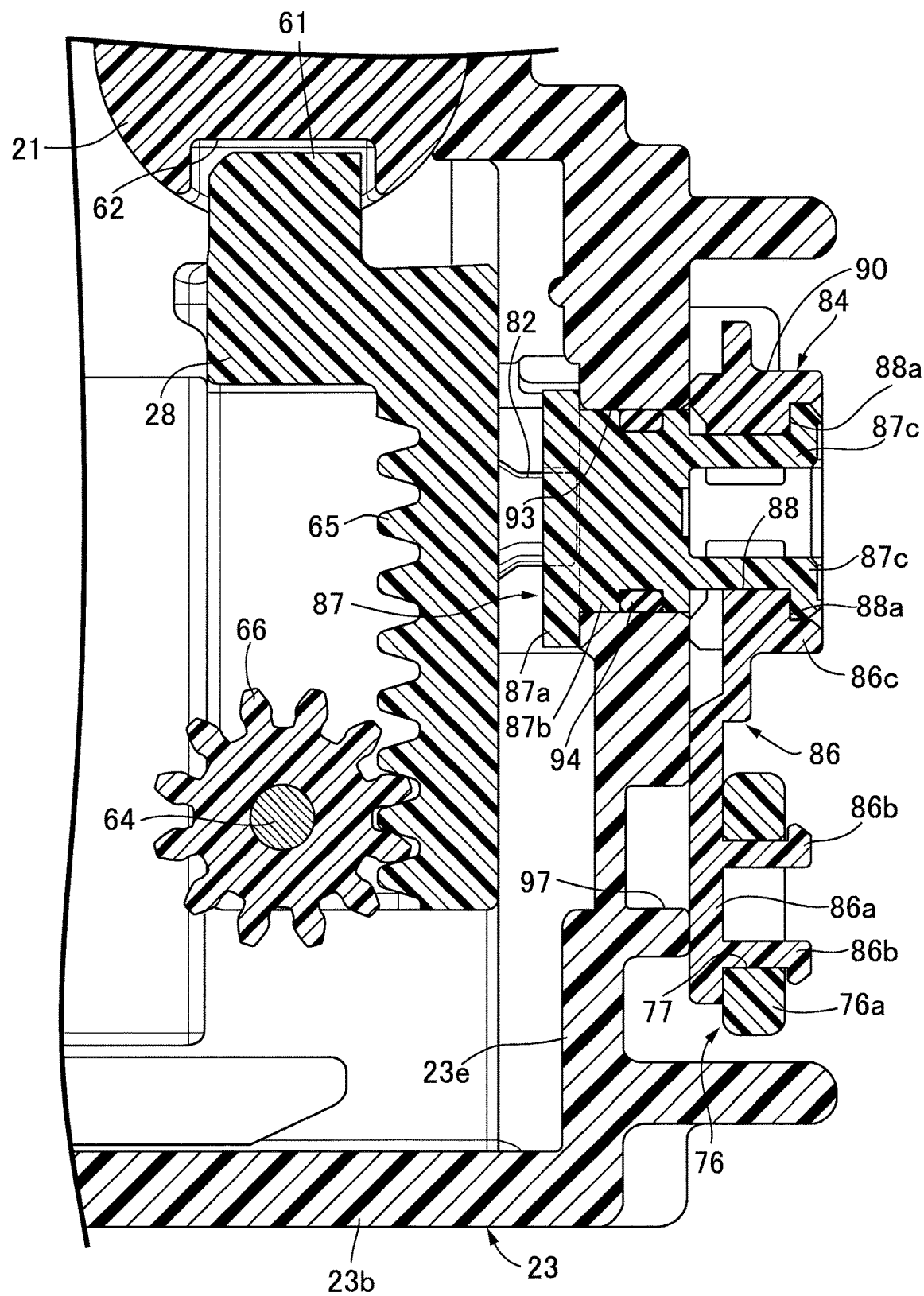
FIG. 16 is a sectional view along line 16-16 in FIG. 14.

Referring in addition to FIG. 16, an operating force-acting direction conversion mechanism 84 is provided between the restriction member 28 and the emergency operation member 76. When the emergency operation member 76 is operated so as to move the emergency operation member 76, the operating force-acting direction conversion mechanism 84 converts the operating force from the emergency operation member 76 into a force operating the restriction member 28 from the restriction position toward the restriction release position in a direction orthogonal to the direction of forward and backward movement of the rod 21.

The operating force-acting direction conversion mechanism 84 is formed from a pressure-receiving projection 82 integrally and projectingly provided on the restriction member 28, a first link member 86 pivoting in response to operation of the emergency operation member 76, and a second link member 87 that has its extremity part abutting against the pressure-receiving projection 82 from the restriction position side and that pivots so as to press the restriction member 28 toward the restriction release position in response to pivoting of the first link member 86. The pressure-receiving projection 82 is integrally and projectingly provided on the restriction member 28 so that its extremity part closely opposes an inner face of the end wall 23e.

Figure 17:
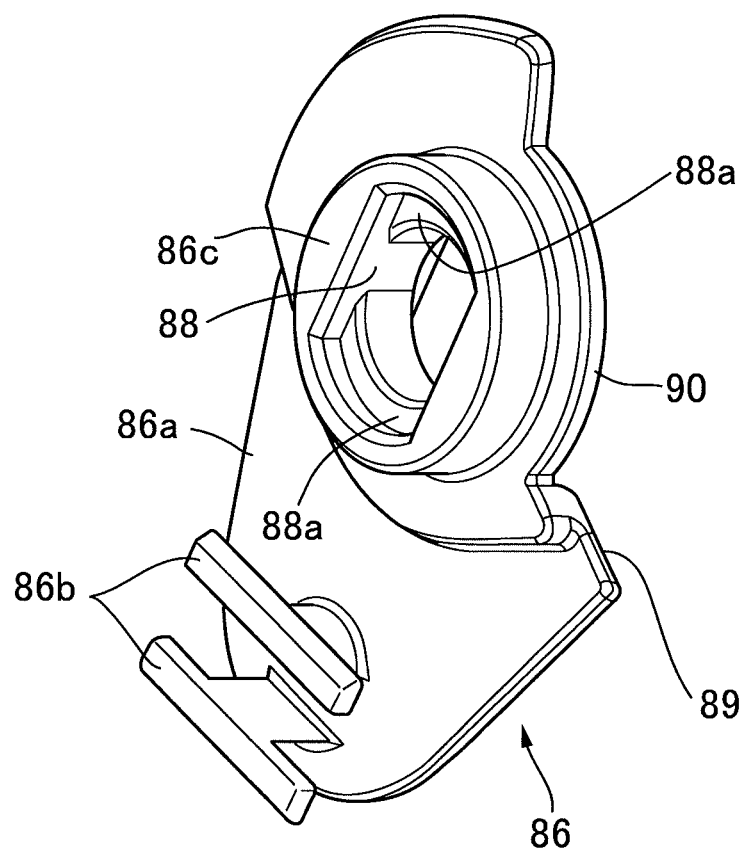
FIG. 17 is a perspective view of a first link member.

Referring in addition to FIG. 17, the first link member 86 is formed so as to integrally have a first link member main portion 86a disposed along the outer face of the end wall 23e in the case main body 23 of the case 22, a pair of first resiliently engaging claws 86b integrally and projectingly provided, on the side opposite to the end wall 23e, on one end part of the first link member main portion 86a so as to pivotably and resiliently engage with the linking portion 76a when inserted into the first linking hole 77 of the emergency operation member 76, and a linking tube portion 86c provided integrally with the other end part of the first link member main portion 86a.

A second linking hole 88 having a rectangular cross section is formed in the linking tube portion 86c, and a latching step portion 88a is formed on each of mutually opposing side faces of an end part, on the side opposite to the end wall 23e, of the second linking hole 88.

A cutout part 90 is formed in part of the outer periphery of the first link member main portion 86a around the linking tube portion 86c, the cutout part 90 having a pivoting restriction face 89 at one end in the peripheral direction. On the other hand, a stopper 91 disposed within the cutout part 90 is projectingly provided on the end wall 23e of the case main body 23, and a stopper face 92 that can abut against the pivoting restriction face 89 is formed on the stopper 91.

The second link member 87 is formed so as to integrally have a second link member main portion 87a disposed along the inner face of the end wall 23e in the case main body 23 of the case 22 while enabling its extremity part to abut against the pressure-receiving projection 82 from the restriction position side, a shaft portion 87b integrally and connectedly provided on a base end part of the second link member main portion 87a so as to be pivotably fitted into a support hole 93 formed in the end wall 23e, and a pair of second resiliently engaging claws 87c integrally and connectedly provided on the other end part of the shaft portion 87b on the outside of the end wall 23e. An annular seal member 94 that is in resilient contact with an inner face of the support hole 93 is fitted around the outer periphery of the shaft portion 87b.

The second resiliently engaging claw 87c is inserted into the second linking hole 88 of first link member 86 while being flexed, and resiliently engages with the latching step portion 88a. This links the second link member 87 non-pivotably to the first link member 86.

In accordance with the operating force-acting direction conversion mechanism 84 having the above arrangement, when the restriction member 28 is in the restriction position and the emergency operation member 76 is in a non-operated state, as shown in FIG. 14 and FIG. 15 the first link member 86 is put into a state in which the pivoting restriction face 89 is made to abut against the stopper face 92 of the stopper 91 and is restricted from pivoting, and an extremity part of the second link member main portion 87a of the second link member 87 remains stationary in a state in which it is close to the pressure-receiving projection 82 of the restriction member 28 from the restriction position side.

When the restriction member 28 is moved from the restriction position toward the restriction release position side by operation of the electric motor 29, the second link member 87 is also held stationary without pivoting by following the pressure-receiving projection 82.

Figure 18:
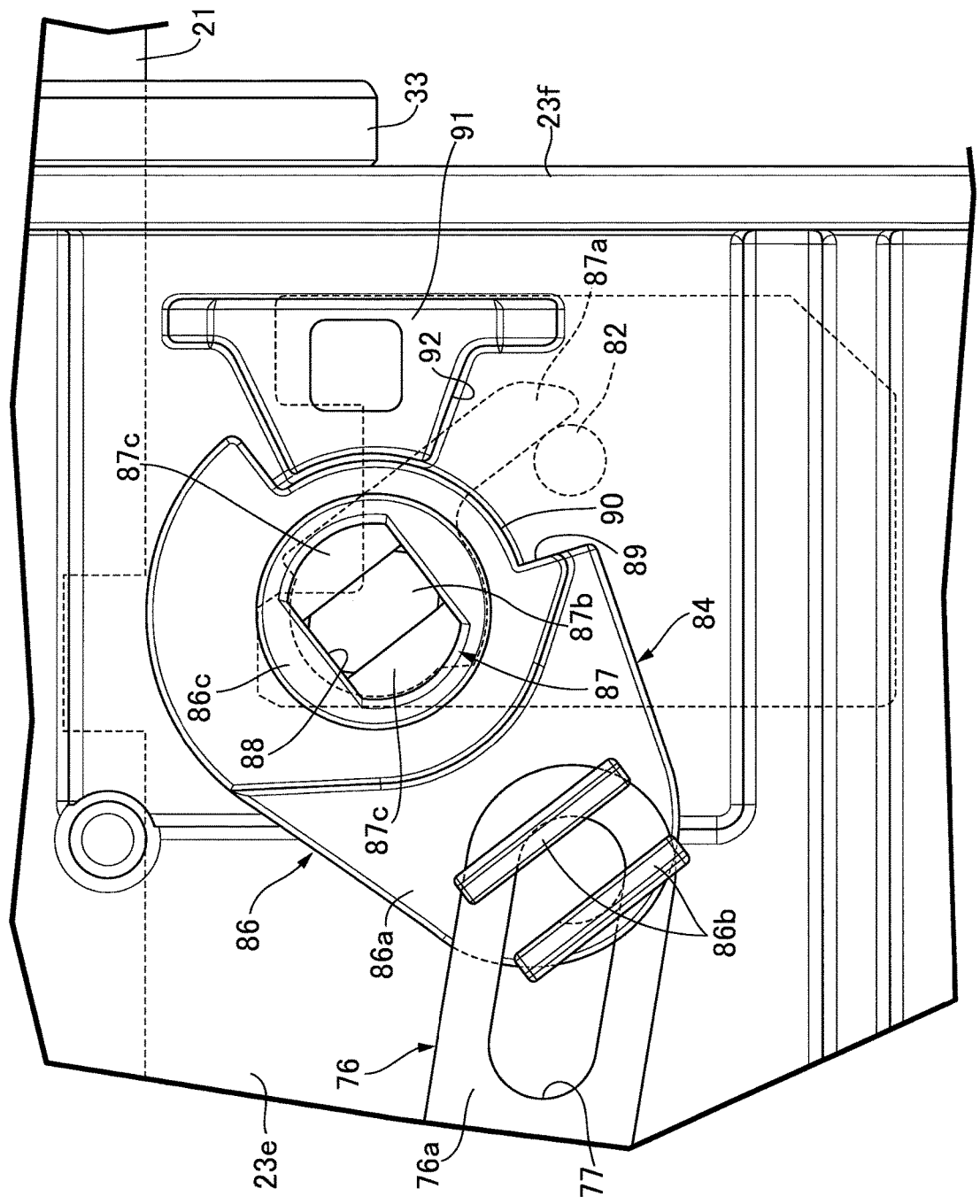
FIG. 18 is a view, corresponding to FIG. 15, in a state in which an emergency operating member is being operated.

When the emergency operation member 76 is pulled in a state in which the restriction member 28 is at the restriction position, as shown in FIG. 18 the first and second link members 86 and 87 pivot, the pressure-receiving projection 82 is pressed by the extremity part of the second link member main portion 87a, and the restriction member 28 moves to the restriction release position. In this arrangement, an end part, on the side opposite to the pivoting restriction face 89 in the peripheral direction, of the cutout part 90 of the first link member 86 will not abut against the stopper 91, and pivoting of the first link member 86 will not be restricted by the stopper 91.

Figure 19:
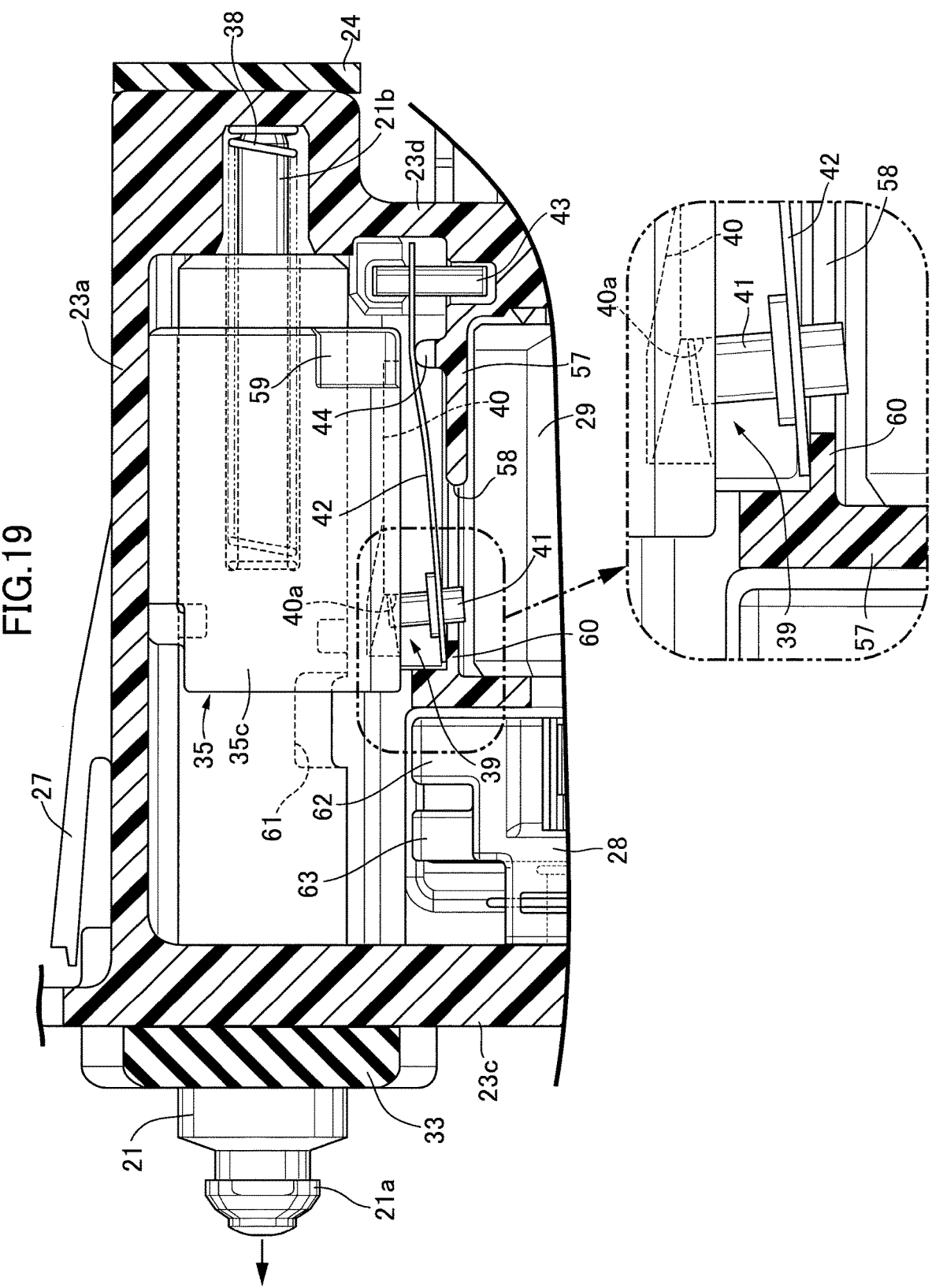
FIG. 19 is an enlarged view of an essential part of FIG. 3 showing a state in which an opening force is forcibly applied to the lid at the closed position.

The operation of the embodiment is now explained; the axial position-restricting groove 40 having the pin-receiving portion 40a facing the protruding position side of the rod 21 is formed in the holder 35 axially relatively non-movably linked to the rod 21. The rod axial direction restricting mechanism 39 restricting the axial position of the rod 21 while enabling the pin 41 to be disengaged from the pin-receiving portion 40a in response to an operation of pushing in the lid 17 in a closed state is formed from the axial position-restricting groove 40 and the plate spring 42 having the pin 41 inserted into the axial position-restricting groove 40 so as to be received by the pin-receiving portion 40a in a state in which the rod 21 is at the lid closed position and exerting a resilient force making the pin 41 resiliently abut against the holder 35. The restricting part 60 restricting displacement of the plate spring 42 toward the side on which the pin 41 is disengaged from the axial position-restricting groove 40 is provided on the case main body 23 of the case 22 so that the restricting part 60 can abut against the plate spring 42. Therefore, even if an opening force is forcibly applied to the lid 17 at the closed position, due to the restricting part 60 abutting against the plate spring 42 as shown in FIG. 19, the plate spring 42 is restricted from being displaced toward the side on which the pin 41 is disengaged from the axial position-restricting groove 40, and the pin 41 will not be disengaged from the axial position-restricting groove 40, thus enhancing the theft resistance.

Furthermore, since the guide part 59 guiding the pin 41 to the axial position-restricting groove 40 is formed on the holder 35, even in a state in which the plate spring 42 is assembled on the case main body 23 of the case 22 the pin 41 can easily be inserted into the axial position-restricting groove 40, thus enhancing the ease of assembly.

An embodiment of the present invention is explained above, but the present invention is not limited to the above-mentioned embodiment and may be modified in a variety of ways as long as the modifications do not depart from the gist of the present invention.

For example, in the above embodiment, the axial position-restricting groove 40 is formed in the holder 35, which is a coupling member axially relatively non-movably linked to the rod 21, but a structure in which the axial position-restricting groove is formed in the rod is also possible.

What is claimed is:

1. A lid opening and closing device for a vehicle, comprising
a lid that is configured to be pivotably supported on a vehicle body exterior plate,
a case that is configured to be mounted on the vehicle body exterior plate,
a rod that can move forward and backward between a pushed-in position in response to the lid being pushed in and a protruding position when the lid is in an open state, the rod being supported on the case so that the rod can attain a lid closed position at which the rod returns from the pushed-in position toward the protruding position side only by a predetermined amount of movement when the lid is in a closed state,
a coupling member operatively attached to the rod and axially relatively non-movable in relation to the rod,
an urging member that urges the rod from the pushed-in position toward the protruding position side and is provided between the case and the rod,
an axial position-restricting groove that has a pin-receiving portion facing the protruding position side and is formed on the rod or on the coupling member, and
a rod axial direction restricting mechanism comprising the axial position-restricting groove and an elastic member that has a pin thereon which is inserted into the axial position-restricting groove while being capable of being received by the pin-receiving portion in a state in which the rod is at the lid closed position, and that exhibits a resilient force making the pin resiliently abut against the rod or the coupling member, the rod axial direction restricting mechanism restricting an axial position of the rod while enabling the pin to be disengaged from the pin-receiving portion in response to an operation of pushing in the lid in a closed state,
the case being integrally provided with a restricting part configured to restrict displacement of the elastic member to a side on which the pin is disengaged from the axial position-restricting groove, the restricting part being capable of abutting against the elastic member,
wherein when a force is applied to the lid at the lid closed position thereof, the pin is not disengaged from the axial position-restricting groove; and
wherein the elastic member comprises a plate-shaped portion that extends lengthwise in a longitudinal direction of the rod, a base end portion comprising a shaft, and a free end portion comprising the pin;
the base end portion is attached to the case via the shaft, such that the elastic member pivots within a predetermined range within the case; and
the elastic member is integrally formed.

2. The lid opening and closing device for a vehicle according to claim 1, wherein the coupling member is a holder that is relatively rotatably but axially relatively non-movably fitted on the rod and in which the axial position-restricting groove is formed, and
the holder has formed thereon a guide part guiding the pin to the axial position-restricting groove.

3. The lid opening and closing device for a vehicle according to claim 1, wherein the rod comprises a stopper which is coaxially, integrally, and projectingly provided thereon, and wherein when the rod is in the pushed-in position, the stopper abuts against an inner wall of the case and restricts movement of the rod.

4. The lid opening and closing device for a vehicle according to claim 1, further comprising an emergency operation member that is operable to release the rod from the rod axial direction restricting mechanism in the event that an electric motor malfunctions, the electric motor being operatively connected with the rod axial direction restricting mechanism.

5. The lid opening and closing device for a vehicle according to claim 1, wherein the elastic member is a plate spring.

6. The lid opening and closing device for a vehicle according to claim 4, wherein the emergency operation member includes a linking portion, a rod-shaped portion connected to the linking portion, and an operating portion provided on an end part of the rod-shaped portion.

\* \* \* \* \*